(12) United States Patent
Chu et al.

(10) Patent No.: US 12,363,771 B2
(45) Date of Patent: Jul. 15, 2025

(54) DEVICE, SYSTEM, AND METHOD FOR MULTI-LINK TUNNELED DIRECT LINK SETUP (TDLS) SETUP

(71) Applicant: NXP USA, Inc., Austin, TX (US)

(72) Inventors: Liwen Chu, San Ramon, CA (US);
Hongyuan Zhang, Fremont, CA (US);
Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 417 days.

(21) Appl. No.: 17/879,645

(22) Filed: Aug. 2, 2022

(65) Prior Publication Data
US 2023/0032255 A1 Feb. 2, 2023

Related U.S. Application Data

(60) Provisional application No. 63/228,314, filed on Aug. 2, 2021.

(51) Int. Cl.
*H04W 76/12* (2018.01)
*H04W 76/14* (2018.01)
*H04W 76/15* (2018.01)

(52) U.S. Cl.
CPC ........... *H04W 76/12* (2018.02); *H04W 76/14* (2018.02); *H04W 76/15* (2018.02)

(58) Field of Classification Search
CPC ..... H04W 76/12; H04W 76/14; H04W 76/15; H04W 92/10; H04W 92/18
See application file for complete search history.

(56) References Cited

U.S. PATENT DOCUMENTS

2024/0040639 A1* 2/2024 Chitrakar .............. H04W 76/12

OTHER PUBLICATIONS

Cariou, Laurent, "IEEE P802.11 Wireless LANs, MLO—35.3.4.1, IEEE 802.11-18/0149r0," Sep. 2021, 7 pages.
Patil, Abhishek et al. "TDLS Handling in MLO", IEEE 802.11-20/1692r2, Oct. 2020, 25 pgs.
Patil, Abhishek et al. "Resolution for CIDs related to TDLS (CC34)", IEEE 802.11-21/0240r8, Mar. 2021, 7 pgs.

* cited by examiner

*Primary Examiner* — Nizam U Ahmed

(57) ABSTRACT

A device, a system, and a method for multi-link Tunneled Direct Link Setup (TDLS) are disclosed. In an embodiment, the device includes a wireless network interface device implemented on one or more integrated circuits (ICs), wherein the wireless network interface device is configured to transmit a TDLS setup request frame to a second device, wherein the TDLS setup request frame announces a plurality of proposed TDLS links to be established with the second device, receive a TDLS setup response frame from the second device, wherein the TDLS setup response frame indicates a plurality of TDLS links selected from the plurality of proposed TDLS links announced by the TDLS setup request frame, and establish the plurality of TDLS links indicated by the TDLS setup response frame with the second device.

20 Claims, 7 Drawing Sheets

DEVICE, SYSTEM, AND METHOD FOR MULTI-LINK TUNNELED DIRECT LINK SETUP (TDLS) SETUP

CROSS-REFERENCE TO RELATED APPLICATIONS

This application is entitled to the benefit of U.S. Provisional Patent Application Ser. No. 63/228,314, filed on Aug. 2, 2021, which is incorporated by reference herein.

BACKGROUND

In wireless communications, wireless devices, e.g., multi-link devices (MLDs), can execute various multi-link operations, such as transmission and reception of frames via one or more communication links. As an example, non-access point (non-AP) MLDs may transmit and receive frames on a link to establish a Tunneled Direct Link Setup (TDLS) link between the non-AP MLDs. For a multi-link TDLS setup, the non-AP MLDs may need exchange frames on each link where a TDLS link is to be established. Consequently, exchanging frames on multiple links to establish multiple TDLS links may be complicated and/or inefficient, which may cause wireless devices to experience restricted performance.

SUMMARY

A device, a system, and a method for multi-link Tunneled Direct Link Setup (TDLS) are disclosed. In an embodiment, the device includes a wireless network interface device implemented on one or more integrated circuits (ICs), where the wireless network interface device is configured to transmit a 30 TDLS setup request frame to a second device, where the TDLS setup request frame announces a plurality of proposed TDLS links to be established with the second device, receive a TDLS setup response frame from the second device, where the TDLS setup response frame indicates a plurality of TDLS links selected from the plurality of proposed TDLS links announced by the TDLS setup request frame, and establish the plurality of TDLS links indicated by the TDLS setup response frame with the second device.

In an embodiment, the device establishes the plurality of TDLS links by transmitting a TDLS setup confirm frame to the second device.

In an embodiment, the device establishes the plurality of TDLS links by transmitting a TDLS setup confirm frame to the second device, and where the TDLS setup confirm frame includes an Extremely High Throughput (EHT) Operation element for a reporting link and a multi-link element with another EHT Operation element for each reported link that determine EHT link operating parameters for the plurality of TDLS links.

In an embodiment, the device and the second device associate with a non-EHT access point (AP).

In an embodiment, the device and the second device associate with a non-EHT AP, and where a link address used to associate with the non-EHT AP is the same as a Media Access Control (MAC) Service Access Point (SAP) of the device.

In an embodiment, a link's band support is used to determine whether a TDLS link can be established.

In an embodiment, the device is a TDLS initiating non-AP multi-link device (MLD), the second device is a TDLS responding non-AP MLD, and the TDLS initiating non-AP MLD and the TDLS responding non-AP MLD are associated with an AP MLD.

In an embodiment, in TDLS Peer Key (TPK)-Key-Data, a MAC address of a TDLS initiating STA (MAC_I) is a MAC SAP address of the TDLS initiating non-AP MLD, a MAC address of a TDLS responding STA (MAC_R) is a MAC SAP address of the TDLS responding non-AP MLD, and a Basic Service Set (BSS) Identifier (BSSID) is a MAC SAP address of the AP MLD.

In an embodiment, the TPK-Key-Data includes the AP MLD's AP addresses of the plurality of TDLS links, link addresses of the plurality of proposed TDLS links of the TDLS initiating non-AP MLD, and link addresses of the plurality of TDLS links of the TDLS responding non-AP MLD.

In an embodiment, the AP MLD's AP addresses of the plurality of TDLS links, the link addresses of the TDLS initiating non-AP MLD, and the link addresses of the TDLS responding non-AP MLD are used for Messenger Integrity Code (MIC) calculation.

In an embodiment, the device is a TDLS initiating non-AP MLD, the second device is a TDLS responding non-AP MLD, and the TDLS initiating non-AP MLD and the TDLS responding non-AP MLD are associated with a non-EHT AP.

In an embodiment, the TDLS initiating non-AP MLD and the TDLS responding non-AP MLD allocate a link ID value to the plurality of TDLS links.

In an embodiment, the TDLS initiating non-AP MLD determines a link ID value of the plurality of TDLS links.

In an embodiment, in TPK-Key-Data, MAC_I is a MAC SAP address of the TDLS initiating non-AP MLD, MAC_R is a MAC SAP address of the TDLS responding non-AP MLD, and a BSSID is a MAC SAP address of the non-EHT AP.

In an embodiment, the TPK-Key-Data includes link addresses of the plurality of proposed TDLS links of the TDLS initiating non-AP MLD, and link addresses of the plurality of TDLS links of the TDLS responding non-AP MLD.

In an embodiment, the plurality of TDLS links includes all of the plurality of proposed TDLS links.

In an embodiment, the plurality of TDLS links includes part of the plurality of proposed TDLS links.

In an embodiment, the TDLS setup request frame and the TDLS setup response frame are transmitted and received via an AP that is associated with the device and the second device, and where the device and the second device exchange frames directly after the plurality of TDLS links are established.

A system for multi-link TDLS setup is also disclosed. In an embodiment, the system includes a first wireless device, where the first wireless device includes a wireless network interface device implemented on one or more ICs, where the wireless network interface device is configured to transmit a TDLS setup request frame, where the TDLS setup request frame announces a plurality of proposed TDLS links to be established, and a second wireless device, where the second wireless device includes another wireless network interface device implemented on one or more other ICs, and where the other wireless network interface device is configured to receive the TDLS setup request frame from the first wireless device, transmit a TDLS setup response frame to the first wireless device in response to the received TDLS setup request frame, where the TDLS setup response frame indicates a plurality of TDLS links selected from the plurality of proposed TDLS links announced by the TDLS setup request frame, and establish the plurality of TDLS links indicated by the TDLS setup response frame between the first wireless device and the second wireless device.

A method for multi-link TDLS setup is also disclosed. In an embodiment, the method includes transmitting, by a first wireless device to a second wireless device, a TDLS setup request frame, where the TDLS setup request frame announces a plurality of proposed TDLS links to be established between the first wireless device and the second wireless device, receiving, by the first wireless device from the second wireless device, a TDLS setup response frame, where the TDLS setup response frame indicates a plurality of TDLS links selected from the plurality of proposed TDLS links announced by the TDLS setup request frame, and establishing the plurality of TDLS links indicated by the TDLS setup response frame between the first wireless device and the second wireless device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
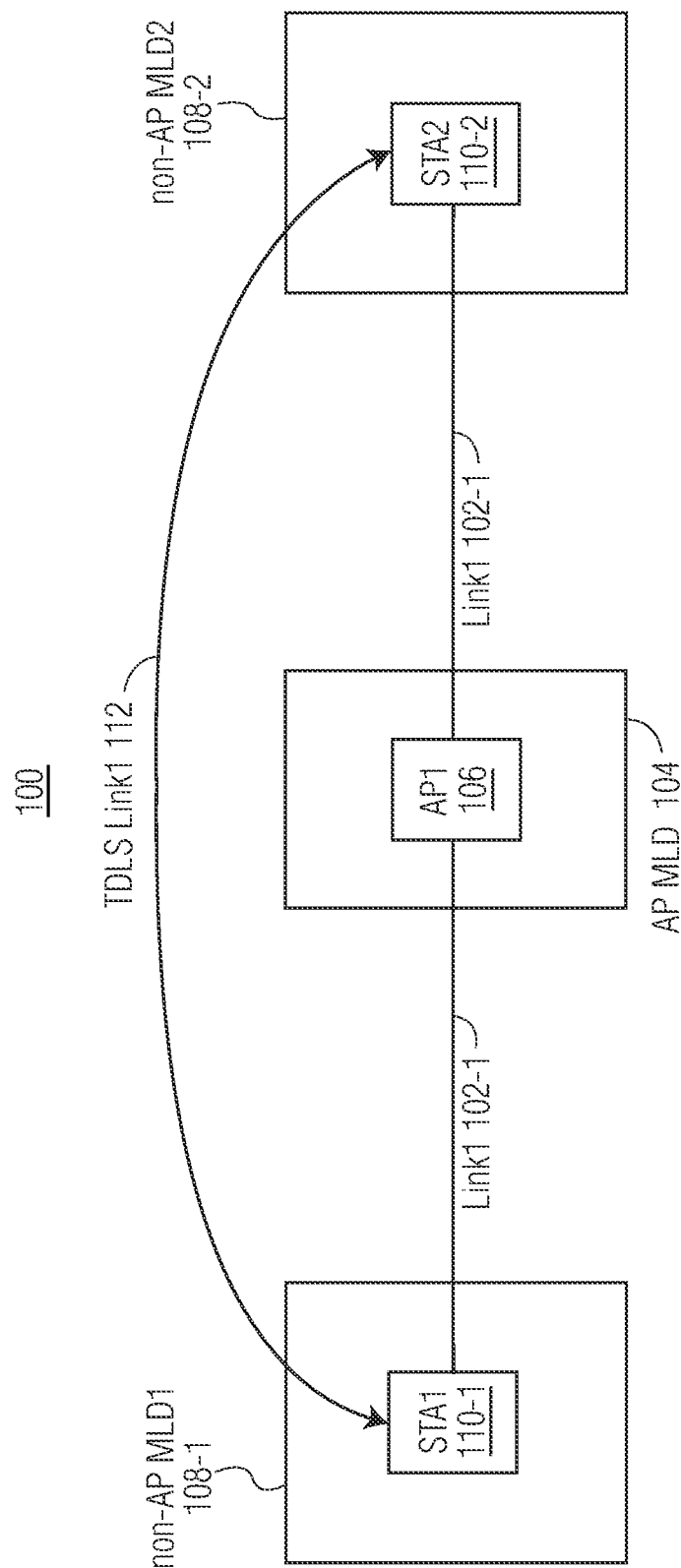
FIG. 1 depicts a communications system with a conventional Tunneled Direct Link Setup (TDLS) link setup.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, phrases "in one embodiment", "in an embodiment", and similar language throughout this specification may, but do not necessarily, all refer to the same embodiment.

In embodiments of a communications system, a wireless device, e.g., an access point (AP) multi-link device (MLD) of a wireless local area network (WLAN) may exchange data with at least one associated non-access point (non-AP) MLD (e.g., a station (STA) MLD). In such an embodiment, the AP MLD may include one or more associated access points (APs) and the non-AP MLD may include one or more associated stations (STAs). The AP MLD may be configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and communications systems operating in accordance with the EHT communication protocol and/or next-generation communication protocols may be referred to herein as "non-legacy" features. In some embodiments of the communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a communications system 100 with a conventional Tunneled Direct Link Setup (TDLS) link setup that is used for wireless (e.g., Wi-Fi) communications. In the embodiment depicted in FIG. 1, the communications system includes one AP MLD, implemented as AP MLD 104, and two non-AP MLDs (e.g., STA MLDs), implemented as non-AP MLD1 108-1 and non-AP MLD2 108-2. In an embodiment, non-AP MLD1 108-1 may be a first device (e.g., first wireless device) and non-AP MLD2 108-2 or AP MLD 104 may be a second device (e.g., second wireless device). The communications system 100 can be used in various applications, such as industrial applications, medical applications, computer applications, and/or consumer or enterprise applications. In some embodiments, the communications system may be a wireless communications system, such as a wireless communications system compatible with an IEEE 802.11 protocol. For example, the communications system may be a wireless communications system compatible with the IEEE 802.11be protocol.

Although the depicted communications system 100 is shown in FIG. 1 with certain components and described with certain functionality herein, other embodiments of the communications system may include fewer or more components to implement the same, less, or more functionality. For example, in some embodiments, the communications system includes a single AP MLD with more or less than two non-AP MLDs, or multiple AP MLDs with more than one non-AP MLD. In another example, although the communications system is shown in FIG. 1 as being connected in a certain topology, the network topology of the communications system is not limited to the topology shown in FIG. 1.

In the embodiment depicted in FIG. 1, AP MLD 104 includes one radio, AP1 106. In some embodiments, a common part of AP MLD 104 implements upper layer Media Access Control (MAC) functionalities (e.g., Beacon creation, MLD association establishment, reordering of frames, etc.) and a link specific part of AP MLD 104, i.e., AP1 106, implements lower layer MAC functionalities (e.g., backoff, frame transmission, frame reception, etc.). AP1 106 may be implemented in hardware (e.g., circuits), software, firmware, or a combination thereof. AP1 106 may be fully or partially implemented as an integrated circuit (IC) device, such that the AP includes a wireless network interface implemented on one more ICs. In some embodiments, AP1 106 may be a wireless AP compatible with at least one WLAN communications protocol (e.g., at least one IEEE 802.11 protocol). For example, AP1 106 may be a wireless AP compatible with the IEEE 802.11be protocol.

In some embodiments, an AP MLD (e.g., AP MLD 104) connects to a local area network (e.g., a Local Area Network (LAN)) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, AP1 106 may operate in different BSS operating channels. For example, AP1 106 may operate in a 320 megahertz (MHz) BSS operating channel at 6 gigahertz (GHz) band or may operate in a 160 MHz BSS operating channel at 5 GHz band. Although AP MLD 104 is shown in FIG. 1 as including one AP, other embodiments of AP MLD 104 may include more than one AP.

In the embodiment depicted in FIG. 1, the non-AP MLDs, implemented as non-AP MLD1 108-1 and non-AP MLD2 108-2, each include one STA (e.g., non-AP STA), STA1 110-1 and STA2 110-2, respectively. In some embodiments, the STAs 110-1 and 110-2 are non-legacy STAs. The STAs 110-1 and 110-2 may be implemented in hardware (e.g., circuits), software, firmware, or a combination thereof. The STAs 110-1 and 110-2 may be fully or partially implemented as an IC device, such that the STAs include a wireless network interface device implemented on one or more ICs.

In some embodiments, the STAs 110-1 and 110-2 are part of the non-AP MLDs 108-1 and 108-2, such that the non-AP MLDs may be communication devices that wirelessly connect to a wireless AP MLD (e.g., AP MLD 104). For example, non-AP MLD1 108-1 and/or non-AP MLD2 108-2 may be implemented in a laptop, a desktop personal computer (PC), a mobile phone, or other communications device that supports at least one WLAN communications protocol. In some embodiments, non-AP MLD1 108-1 and non-AP MLD2 108-2 are communication devices compatible with at least one IEEE 802.11 protocol (e.g., the IEEE 802.11be protocol). In some embodiments, non-AP MLDs 108-1 and 108-2 implement a common MAC data service interface and the STAs 110-1 and 110-2 implement a lower layer MAC data service interface. Although the non-AP MLDs 108-1 and 108-2 are shown in FIG. 1 as including one STA, other embodiments of the non-AP MLDs may include more than one STA.

In some embodiments, AP MLD 104, non-AP MLD1 108-1, and/or non-AP MLD2 108-2 can identify which devices support TDLS links during a TDLS setup phase and/or exchanges information regarding TDLS capabilities during the TDLS setup phase. In some embodiments, each of the STAs 110-1 and 110-2 may operate in a same frequency band, which may allow STAs 110-1 and 110-2 to establish a TDLS link, implemented as TDLS Link1 112. For example, STA1 110-1 may operate in the 2.4 GHz frequency band and STA2 110-2 may operate in the 2.4 GHz frequency band. If STAs 110-1 and 110-2 operated in different frequency bands (e.g., 2.4 GHz frequency band and 5 GHz frequency band), then STAs 110-1 and 110-2 would not be able to establish a TDLS link.

In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, non-AP MLD1 108-1 and non-AP MLD2 108-2 communicate with AP MLD 104 via a communication link, implemented as Link1 102-1. For example, non-AP MLD1 108-1 (through STA 110-1) and/or non-AP MLD2 108-2 (through STA 110-2) communicates with AP MLD 104 (through AP1 106) via Link1 102-1. In an embodiment, a communication link (e.g., Link1 102-1) may include a BSS operating channel established by an AP (e.g., AP1 106) that features multiple 20 MHz channels used to transmit frames in Physical Layer Convergence Procedure (PLCP) Protocol Data Units (PPDUs) (e.g., Date frames, Control frames, Management frames, Beacon frames, Action frames, etc.) between an AP MLD and a non-AP MLD. The PPDUs may be transmitted at signal bandwidths of, for example, 80 MHz, 160 MHz, or 320 MHz, and may include 20 MHz channels (sometimes referred to as "units"). In some embodiments, a 20 MHz channel may be a punctured 20 MHz channel (sometimes referred to as a "punctured channel" or a "punctured unit") or an unpunctured 20 MHz channel (sometimes referred to as an "unpunctured channel" or an "unpunctured unit"). Similar channels or units of a PPDU may be aggregated to form larger units (sometimes referred to as "segments"). For example, two unpunctured channels may be aggregated to form one unpunctured segment with a bandwidth of 40 MHz. Although AP MLD 104 communicates (e.g., wirelessly communicates) with the non-AP MLDs 108-1 and 108-2 via Link1 102-1, in other embodiments, AP MLD 104 may communicate (e.g., wirelessly communicate) with the non-AP MLDs via more than one communication link.

In an embodiment, non-AP MLD1 108-1 (through STA1 110-1) and non-AP MLD2 108-2 (through STA2 110-2) may communicate directly via TDLS Link1 112. To establish the TDLS link, non-AP MLDs 108-1 and 108-2 may first exchange frames using Link1 102-1. As described herein, when a TDLS link is "established", establishing the TDLS link(s) may involve two non-AP MLDs exchanging frames to form a new connection that may be used for direct communications, and that may be defined by TDLS link standards and/or capabilities/operating parameters of two STAs. For example, each non-AP MLD (through its affiliated STA) transmits and/or receives frames on Link1 102-1 via AP MLD 104 (through AP1 106) to communicate information related to establishing TDLS Link1 112. Such frames may include TDLS setup frames, i.e., a TDLS setup request frame, a TDLS setup response frame, and a TDLS setup confirm frame that include information related to TDLS link capability, TDLS link parameters, and other TDLS link-related information. In one embodiment, the TDLS setup frames include a multi-link element for MLD information. In an embodiment, non-AP MLDs 108-1 and 108-2 may communicate directly via TDLS Link1 112 or indirectly via Link1 102-1 using AP MLD 104 (through AP1 106). By establishing TDLS Link1 112, the efficiency of the communication system 100 may be improved because communication via the TDLS link reduces the amount of traffic that is exchanged in the network and prevents congestion at AP MLD 104 (through AP1 106).

Figure 2:
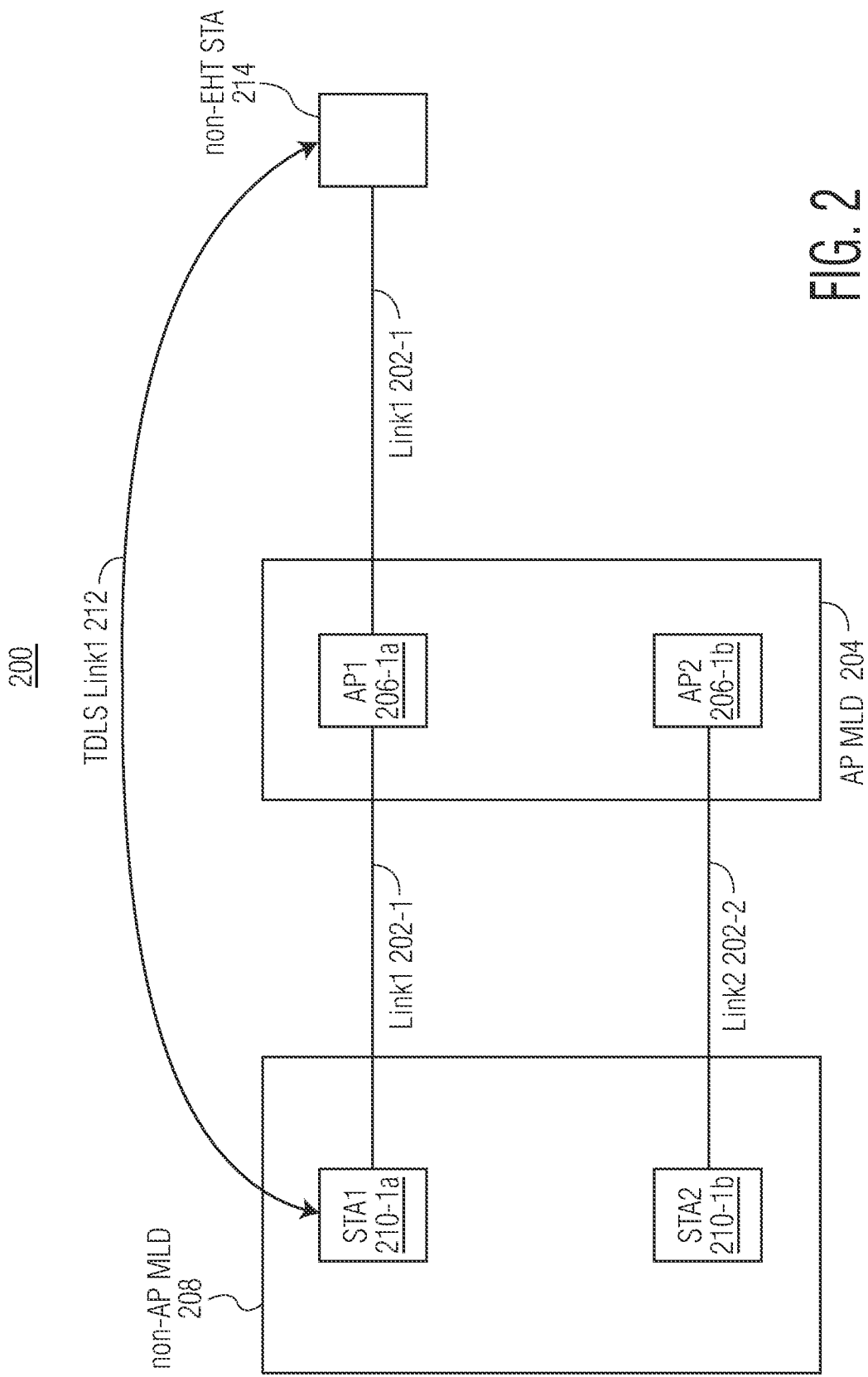
FIG. 2 depicts a communications system with a conventional TDLS link setup.

FIG. 2 depicts another communications system 200 with a conventional TDLS link setup. The communications system 200 shown in FIG. 2 includes an AP MLD 204 with two APs, implemented as AP1 206-1a and AP2 206-1b, a non-AP MLD 208 with two STAs, implemented as STA1 210-1a and STA2 210-1b, and a non-EHT STA 214. Non-EHT STA 214 may be a legacy STA, such that it is not compatible with an IEEE 802.11be communication protocol or other non-legacy communication protocol. In an embodiment, STA1 210-1a and non-EHT STA 214 communicate with AP1 206-1a via Link1 202-1, and STA2 210-1b communicates with AP2 206-1b via Link2 202-2. Additionally, STA1 210-1a and non-EHT STA 214 can communicate directly via TDLS Link1 212. Because non-EHT STA 214 is a legacy STA, TDLS Link1 212 is a legacy TDLS link, i.e., TDLS Link1 212 is compatible with a legacy communication protocol.

To establish TDLS Link1 212, STA1 210-1a and non-EHT STA 214 exchange frames on Link1 202-1 via AP1 206-1a. For example, STA1 210-1a transmits a TDLS setup request frame to AP1 206-1a, and AP1 206-1a forwards the TDLS setup request frame to non-EHT STA 214. In response, non-EHT STA 214 transmits a TDLS setup response frame to AP1 206-1a, and AP1 forwards the TDLS setup response frame to STA1 210-1a. STA1 210-1a then transmits a TDLS setup confirm frame to non-EHT STA 214 which establishes TDLS Link1 212. In some embodiments, STA2 210-1b may not be able to establish a TDLS link with non-EHT STA 214 because STA2 is not connected to the same AP as non-EHT STA 214.

Although not shown by FIG. 1 and FIG. 2, in some embodiments, an AP MLD (e.g., AP MLD 204) may have two APs (e.g., AP1 206-1a and AP2 206-1b) that are each connected to two STAs of two non-AP MLDs. For example, AP1 206-1a may be connected to a first STA of a first non-AP MLD (e.g., STA1a of non-AP MLD1) and to a first STA of a second non-AP MLD (e.g., STA2a of non-AP MLD2) via a first link (e.g., Link1), and AP2 206-1b may be connected to a second STA of the first non-AP MLD (e.g., STA1b of non-AP MLD1) and to a second STA of the second non-AP MLD (e.g., STA2b of non-AP MLD2) via a second link (e.g., Link2). In such an example, two TDLS links may be established, such that a first TDLS link (e.g., TDLS Link1) is established between STA1a of non-AP MLD1 and STA2a of non-AP MLD2, and a second TDLS link (e.g., TDLS Link2) is established between STA1b of non-AP MLD1 and STA2b of non-AP MLD2.

According to conventional TDLS link setup techniques, each TDLS link (e.g., TDLS Link1 and TDLS Link2) may need to be established independently. For example, STA1a of non-AP MLD1 and STA2a of non-AP MLD2 need to exchange frames to establish TDLS Link1, and STA1b of non-AP MLD1 and STA2b of non-AP MLD2 need to exchange frames to establish TDLS Link2. Consequently, two TDLS links between two non-AP MLDs may not easily be shared by each traffic stream of a Traffic Identifier (TID) because frames of the TID may be dynamically transmitted in any TDLS link. In addition, having to establishing each TDLS link independently may be complicated and/or inefficient. As such, wireless devices using conventional TDLS link setup techniques may experience restricted performance.

In accordance with an embodiment of the invention, a device includes a wireless network interface device implemented on one or more ICs, wherein the wireless network interface device is configured to transmit a TDLS setup request frame to a second device, wherein the TDLS setup request frame announces a plurality of proposed TDLS links to be established with the second device, receive a TDLS setup response frame from the second device, wherein the TDLS setup response frame indicates a plurality of TDLS links selected from the plurality of proposed TDLS links announced by the TDLS setup request frame, and establish the plurality of TDLS links indicated by the TDLS setup response frame with the second device. By establishing the plurality of TDLS links via frames exchanged between the device and the second the device, multiple TDLS links can be established between the devices using (only) one sequence of a TDLS setup request frame, a TDLS setup response frame, and a TDLS setup confirm frame via one link and one STA from each device. As such, multiple TDLS links may have one common interface to an up layer so that each traffic steam can smoothly use the multiple TDLS links. Additionally, a multi-link TDLS setup between two devices may be established more efficiently, and wireless devices using such TDLS link establishing techniques may experience an improvement of performance.

As described herein, a device (sometimes referred to as a "first device" or a "first wireless device") is a first non-AP MLD or an STA of the first non-AP MLD. The first device transmits the TDLS setup request frame, receives the TDLS setup response frame, and transmits the TDLS setup confirm frame, and may be referred to herein to as a "TDLS initiator", a "TDLS initiating device", a "TDLS initiating MLD", or a "TDLS initiating non-AP MLD". In addition, as described herein, a second device (sometimes referred to as a "second wireless device") is a second non-AP MLD or an STA of the second non-AP MLD. The second device receives the TDLS setup request frame, transmits the TDLS setup response frame, and receives the TDLS setup confirm frame, and may be referred to herein as a "TDLS responder", a "TDLS responding device", a "TDLS responding MLD", or a "TDLS responding non-AP MLD".

As described herein, a "multi-link TDLS setup" may refer to a communications system that includes two devices (e.g., a first non-AP MLD and a second non-AP MLD) that are connected by two or more TDLS links. In addition, "multi-link TDLS setup" may refer to the process of establishing multiple TDLS links between the two device. When establishing a multi-link TDLS setup, TDLS setup frames (e.g., TDLS setup request frame, TDLS setup response frame, and/or TDLS setup confirm frame) may include various elements in the frame to carry information of a reporting link (e.g., the link or channel where the frame is transmitted) and a multi-link element where capabilities and operating parameters of other TDLS links (e.g., reported link(s)) that are to be established are defined.

In an embodiment, when an AP MLD forwards (transmits) a frame (e.g., a TDLS setup frame) from a TDLS initiator to a TDLS responder and/or from the TDLS responder to the TDLS initiator, a link where the frame is received and a link where the frame is forwarded can be different. In some embodiments, a TDLS setup frame (e.g., TDLS setup request frame, TDLS setup response frame, and/or TDLS setup confirm frame) may carry a link indication for elements included in the TDLS setup frame, such that the link indication indicates which frames the elements belong to. In such an embodiment, there may not be a link indication for a multi-link element included in the TDLS setup frame. In some embodiments, when receiving a frame (e.g., TDLS setup frame) in a link (in a channel), the AP MLD forwards the frame in the same link (same channel).

As described herein, "proposed TDLS links" may be part or all of the links that a TDLS initiating non-AP MLD may be associated with an AP MLD through. For example, a TDLS initiating non-AP MLD that has three links in three bands (e.g., 2.4 GHz band, 5 GHz band, and 6 GHz band) can (only) establish a two-link TDLS connection through an associated two-link AP MLD that supports two bands (e.g., links in 5 GHz band and 6 GHz band), such that the TDLS links are in 5 GHz band and 6 GHz band, respectively. In some embodiments, the proposed TDLS links may include links that the AP MLD does not support. For example, a TDLS initiating non-AP MLD and a TDLS responding non-AP MLD that both have three links in three bands (e.g., 2.4 GHz band, 5 GHz band, and 6 GHz band) can establish a three-link TDLS connection through an associated two-link AP MLD that supports two bands (e.g., links in 5 GHz band and 6 GHz band), such that the TDLS links are in 2.4 GHz band, 5 GHz band, and 6 GHz band, respectively.

In one embodiment, a link ID of the link that is not supported by the AP MLD is selected by the TDLS initiating non-AP MLD. In another embodiment, the link ID of the link that is not supported by the AP MLD is selected by the TDLS responding non-AP MLD. In one embodiment, the TDLS responding non-AP MLD may accept some or all of the TDLS links proposed by the TDLS initiating non-AP MLD (to setup TDLS connection). In one embodiment, the TDLS links include the link where a TDLS setup request frame is transmitted. In another embodiment, established TDLS links do not include the link where the TDLS setup request frame is transmitted. In some embodiments, all the STAs of the TDLS initiating non-AP MLD and all the STAs of the TDLS responding non-AP MLD in the established TDLS links are in active mode after the multi-link TDLS setup.

In some embodiments, two non-AP MLDs may be associated with one AP MLD in a multi-link BSS or with one AP in a non-EHT BSS (AP in the non-EHT BSS does not support EHT-related features). In an embodiment, one non-AP MLD is a TDLS initiator, and one non-AP MLD is a TDLS responder. The TDLS initiator and the TDLS responder can establish TDLS links in one or multiple links by exchanging a TDLS setup request frame, a TDLS setup response frame, and a TDLS setup confirm frame. An example of communications between devices for establishing a multi-link TDLS setup is described in further detail with reference to FIG. 3.

Figure 3:
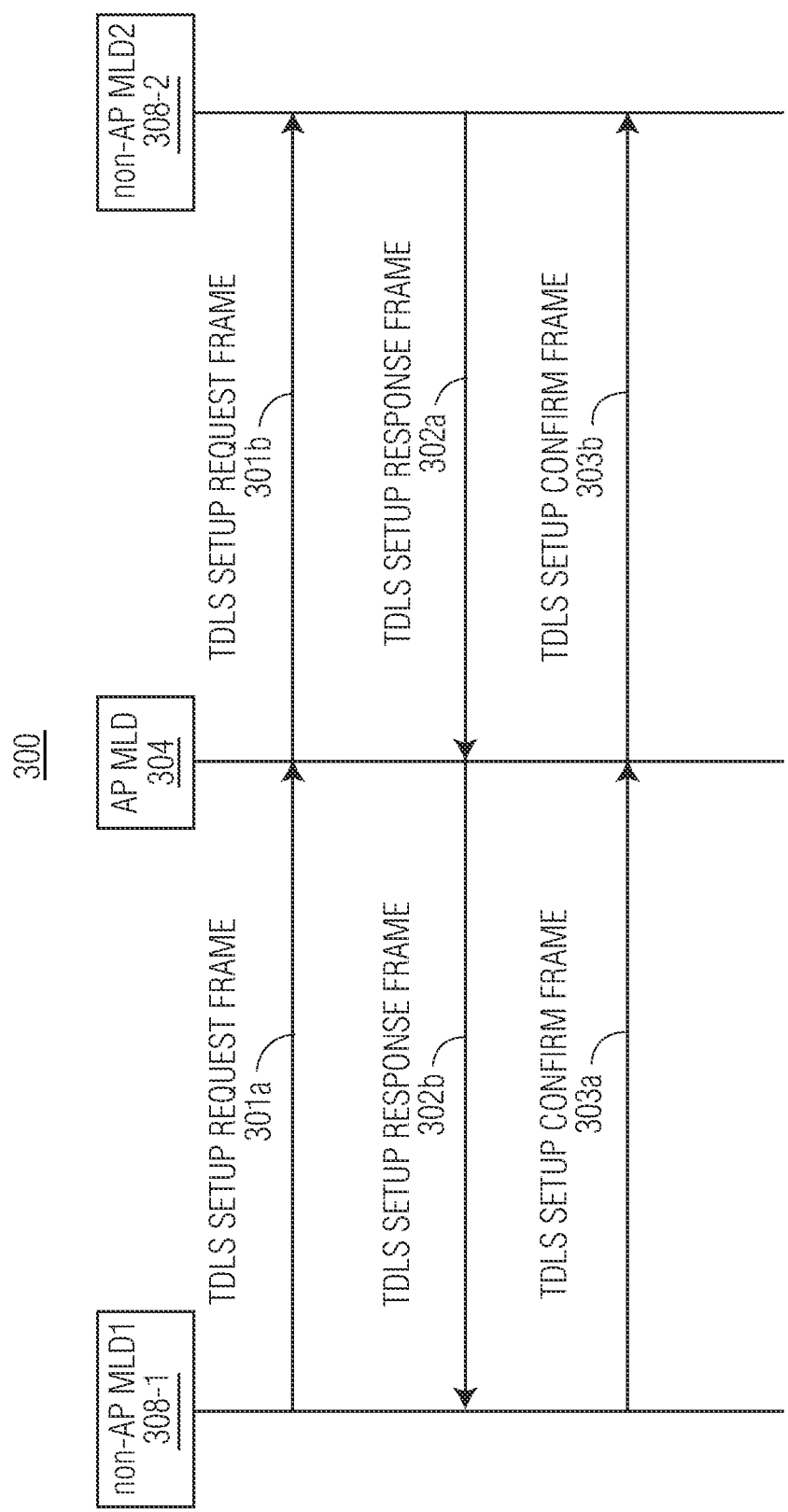
FIG. 3 illustrates communications between devices for establishing a multi-link TDLS setup.

FIG. 3 illustrates communications 300 between devices for establishing a multi-link TDLS setup. In the embodiment of FIG. 3, the devices include an AP MLD, a first non-AP MLD, and a second non-AP MLD, implemented as AP MLD 304, non-AP MLD1 308-1, and non-AP MLD2 308-2, respectively. In some embodiments, AP MLD 304 may be a single link AP MLD or a multi-link AP MLD, such that the AP MLD may include one or more APs (not shown). In an embodiment, non-AP MLD1 308-1 and non-AP MLD2 308-2 may each include one affiliated STA (not shown) that are each associated with AP MLD 304 via one link. Examples of the AP MLD, the first non-AP MLD, and the second non-AP MLD where the non-AP MLDs include two STAs are described with reference to FIG. 4 and FIG. 5.

Non-AP MLD1 308-1 and non-AP MLD2 308-2 may communicate with AP MLD 304 to establish the multi-link TDLS setup. As an example, establishing the multi-link TDLS setup involves establishing a plurality of TDLS links (not shown) between non-AP MLD1 308-1 and non-AP MLD2 308-2. In such an example, to establish the multi-link TDLS setup that includes the plurality of TDLS links, non-AP MLD1 308-1 and non-AP MLD2 308-2 may transmit and receive frames via AP MLD 304.

At step 301a, non-AP MLD1 308-1 transmits a TDLS setup request frame to AP MLD 304 and at step 301b, AP MLD 304 transmits (forwards) the TDLS setup request frame to non-AP MLD2 308-2.

In an embodiment, the TDLS setup request frame announces a plurality of proposed TDLS links to be established between the first non-AP MLD (e.g., non-AP MLD1 308-1) and the second non-AP MLD (e.g., non-AP MLD2 308-2). As described herein, when the TDLS setup request frame "announces" the plurality of proposed TDLS links to be established, "announcing" may imply indicating a number and connection point(s) (e.g., which device(s)) of the proposed TDLS links that a corresponding wireless device (e.g., first non-AP MLD) wants to establish with another wireless device (e.g., second non-AP MLD).

In some embodiments, the TDLS setup request frame includes various elements to announce capabilities of a link where the TDLS setup request frame is transmitted (e.g., by a TDLS initiator) and a multi-link element with per-station (per-STA) profiles to announce capabilities and/or operating parameters of other links (other than the link where the TDLS setup request frame is transmitted). In an embodiment, the various elements and the multi-link element announce links for multi-link TDLS establishment. In some embodiments, the TDLS setup request frame (only) includes common information when single-link TDLS is established between two non-AP MLDs. In one embodiment, the TDLS setup request frame carries a link identification to announce a link which is defined by elements (other than a multi-link element) included in the TDLS setup request frame. As such, an AP MLD can forward a received TDLS setup request frame in any link.

When non-AP MLD2 308-2 receives the TDLS setup request frame that announces the plurality of proposed TDLS links, the second non-AP MLD may determine which of the proposed TDLS links to select. In an embodiment, TDLS links selected from the proposed TDLS links are the TDLS links that the second non-AP MLD wants to establish with the first non-AP MLD. For example, the second non-AP MLD may want to select none of the proposed TDLS links, part of the proposed TDLS links, or all of the proposed TDLS links.

At step 302*a*, non-AP MLD2 308-2 transmits a TDLS setup response frame to AP MLD 304 and at step 302*b*, AP MLD 304 transmits (forwards) the TDLS setup response frame to non-AP MLD1 308-1. The TDLS setup response frame may be transmitted by non-AP MLD2 308-2 in response to receiving the TDLS setup request frame.

In an embodiment, the TDLS setup response frame indicates a plurality of TDLS links selected from the plurality of proposed TDLS links announced by the TDLS setup request frame. As described herein, when the TDLS setup response frame indicates the plurality of TDLS links "selected" from the plurality of proposed TDLS links, "selected" may imply the number and the connection point(s) of the plurality of TDLS links that a corresponding wireless device (e.g., second non-AP MLD) has approved (from the plurality of proposed TDLS links) to be established with another wireless device (e.g., first non-AP MLD).

In some embodiments, the TDLS setup response frame includes various elements to announce capabilities and/or operating parameters of a link where the TDLS setup response frame is transmitted (e.g., by a TDLS responder) and a multi-link element with per-STA profiles to announce capabilities of other links (other than the link where the TDLS setup response frame is transmitted). In an embodiment, the various elements and the multi-link element announce links selected by the TDLS responder. In some embodiments, the TDLS setup response frame (only) includes common information when single-link TDLS is established between two non-AP MLDs. In one embodiment, the TDLS setup response frame carries a link identification to announce a link which is defined by elements (other than a multi-link element) included in the TDLS setup response frame. As such, an AP MLD can forward a received TDLS setup response frame in any link.

When non-AP MLD1 308-1 receives the TDLS setup response frame that indicates the plurality of TDLS links selected from the plurality of proposed TDLS links, the first non-AP MLD may then establish the plurality of TDLS links. In an embodiment, the first non-AP MLD may determine where to establish the plurality of TDLS links, and may determine TDLS link operating parameters for the plurality of TDLS links.

At step 303*a*, non-AP MLD1 308-1 transmits a TDLS setup confirm frame to AP MLD 304 and at step 301*b*, AP MLD 304 transmits (forwards) the TDLS setup confirm frame to non-AP MLD2 308-2. The TDLS setup confirm frame may be transmitted by non-AP MLD1 308-1 in response to receiving the TDLS setup response frame.

In an embodiment, the TDLS setup confirm frame establishes the plurality of TDLS links between the first non-AP MLD (e.g., non-AP MLD1 308-1) and the second non-AP MLD (e.g., non-AP MLD2 308-2). In some embodiments, the TDLS setup confirm frame includes various elements to announce capabilities and/or operating parameters of a link where the TDLS setup confirm frame is transmitted (e.g., by a TDLS initiator) and a multi-link element with per-STA profiles to announce capabilities and/or operating parameters of other links (other than the link where the TDLS setup confirm frame is transmitted). In an embodiment, the various elements and the multi-link element announce links for multi-link TDLS establishment. In some embodiments, the TDLS setup confirm frame (only) includes common information when single-link TDLS is established between two non-AP MLDs. In one embodiment, the TDLS setup confirm frame carries a link identification to announce a link which is defined by elements (other than a multi-link element) included in the TDLS setup confirm frame. As such, an AP MLD can forward a received TDLS setup confirm frame in any link.

Using the communications 300 illustrated by FIG. 3, wireless devices can establish multiple TDLS links by exchanging frames using (only) one link and one STA from each device. By using one link and one STA from each device to establish a multi-link TDLS setup, a traffic stream of a device can be flexibly transmitted in any established TDLS link. In addition, by using one link and one STA from each device to establish the multi-link TDLS setup, traffic on other links can be reduced and TDLS links may be established between STAs that are not connected to an AP. As such, using the communications 300 to establish the multi-link TDLS setup may be simpler and more efficient than using conventional multi-link TDLS setup techniques, and may further improve communications between wireless devices. Examples of communication systems with a multi-link TDLS setup established using the communications 300 (FIG. 3) are described in further detail with reference to FIG. 4 and FIG. 5.

Figure 4:
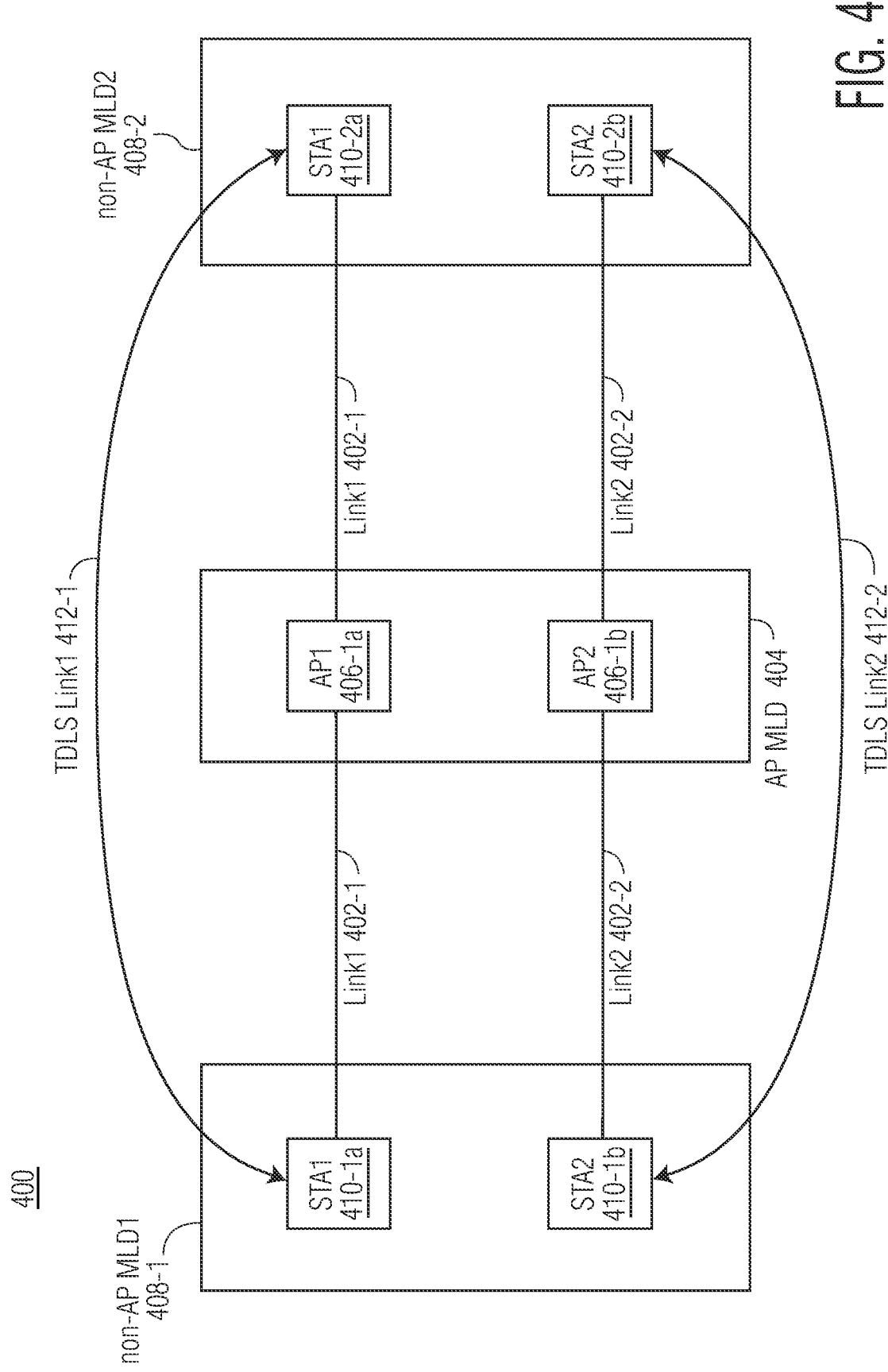
FIG. 4 depicts an example of a communications system with a multi-link TDLS setup.

FIG. 4 depicts an example of a communications system 400 with a multi-link TDLS setup. The communications system 400 shown in FIG. 4 includes an AP MLD, a first non-AP MLD, and a second non-AP MLD, implemented as AP MLD 404, non-AP MLD1 408-1, and non-AP MLD2 408-2, respectively. In an embodiment, AP MLD 404 includes two APs, implemented as AP1 406-1*a* and AP2 406-1*b*, non-AP MLD1 408-1 includes two STAs, implemented as STA1 410-1*a* and STA2 410-1*b*, and non-AP MLD2 408-2 includes two STAs, implemented as STA1 410-2*a* and STA2 410-2*b*.

STA1 410-1*a* of non-AP MLD1 408-1 and STA1 410-2*a* of non-AP MLD2 408-2 are connected to AP1 406-1*a* via Link1 402-1, and STA2 410-1*b* of non-AP MLD1 408-1 and STA2 410-2*b* of non-AP MLD2 408-2 are connected to AP2 406-1*b* via Link2 402-2. In addition, STA1 410-1*a* and STA1 410-2*a* are directly connected via TDLS Link1 412-1, and STA2 410-1*b* and STA2 410-2*b* are directly connected via TDLS Link2 412-2.

In one embodiment, to establish two TDLS links, non-AP MLD1 408-1 transmits a TDLS setup request frame to AP MLD 404 (with a final destination being non-AP MLD2 408-2) via one of two links (e.g., Link1 402-1 or Link2 402-2), then AP MLD 404 forwards the TDLS setup request frame to non-AP MLD2 408-2 via Link1 402-1 or Link2 402-2. After processing the received TDLS setup request frame, non-AP MLD2 408-2 transmits a TDLS setup response frame to AP MLD 404 (with a final destination being non-AP MLD1 408-1) via Link1 402-1 or Link2 402-2, then AP MLD 404 forwards the TDLS setup response frame to non-AP MLD1 408-1 via Link1 402-1 or Link2 402-2. After processing the TDLS setup response frame, non-AP MLD1 408-1 transmits a TDLS setup confirm frame to AP MLD 404 via Link1 402-1 or Link2 402-2, then AP MLD 404 forwards the TDLS setup confirm frame to non-AP MLD2 408-2 via Link1 402-1 or Link2 402-2.

In one embodiment, non-AP MLD1 408-1 (through STA1 410-1*a*) and non-AP MLD2 408-2 (through STA1 410-2*a*) exchange frames via Link1 402-1 to establish TDLS Link1 412-1 and TDLS Link2 412-2. In another embodiment, non-AP MLD1 408-1 (through STA2 410-1*b*) and non-AP MLD2 408-2 (through STA2 410-2*b*) exchange frames via Link2 402-2 to establish TDLS Link1 412-1 and TDLS Link2 412-2. For example, STA1 410-1*a* and STA1 410-2*a* or STA2 410-1*b* and STA2 410-2*b* may exchange frames according to the communications 300 described with reference to FIG. 3. In such an example, a TDLS setup request frame, a TDLS setup response frame, and a TDLS setup confirm frame includes a multi-link element that carries common information (only) and per-STA profiles.

In some embodiments, non-AP MLD1 408-1 may be a TDLS initiating non-AP MLD and non-AP MLD2 408-2 may be a TDLS responding non-AP MLD. In such an embodiment, in TDLS Peer Key (TPK)-Key-Data, a MAC address of a TDLS initiating STA (MAC_I) (e.g., STA1 410-1*a* or STA2 410-1*b*) is a MAC Service Access Point (SAP) address of the TDLS initiating non-AP MLD, a MAC address of a TDLS responding STA (MAC_R) (e.g., STA1 410-2*a* or STA2 410-2*b*) is a MAC SAP address of the TDLS responding non-AP MLD, and a BSS Identifier (BSSID) is a MAC SAP address of the AP MLD.

The TPK-Key-Data also includes the AP MLD's AP addresses of the plurality of TDLS links (on which a TDLS initiating non-AP MLD requests to perform direct-link data frame exchanges), link addresses of the plurality of proposed TDLS links of the TDLS initiating non-AP MLD (on which the TDLS initiating non-AP MLD agrees to perform direct-link data frame exchanges), and link addresses of the plurality of TDLS links of the TDLS responding non-AP MLD (on which the TDLS responding non-AP MLD agrees to perform direct-link data frame exchanges). In some embodiments, the AP addresses of the AP MLD, the link addresses of the TDLS initiating non-AP MLD, and the link addresses of the TDLS responding non-AP MLD included in the TPK-Key-Data are used for TPK calculation. In some embodiments, the AP MLD's AP addresses of the plurality of TDLS links, the link addresses of the plurality of proposed TDLS links of the TDLS initiating non-AP MLD, and the link addresses of the plurality of TDLS links of the TDLS responding non-AP MLD in the TPK-Key-Data are authenticated. In some embodiments, the AP MLD's AP addresses of the plurality of TDLS links, the link addresses of the plurality of proposed TDLS links of the TDLS initiating non-AP MLD, and the link addresses of the plurality of TDLS links of the TDLS responding non-AP MLD in the TPK-Key-Data are used for Messenger Integrity Code (MIC) calculation.

Figure 5:
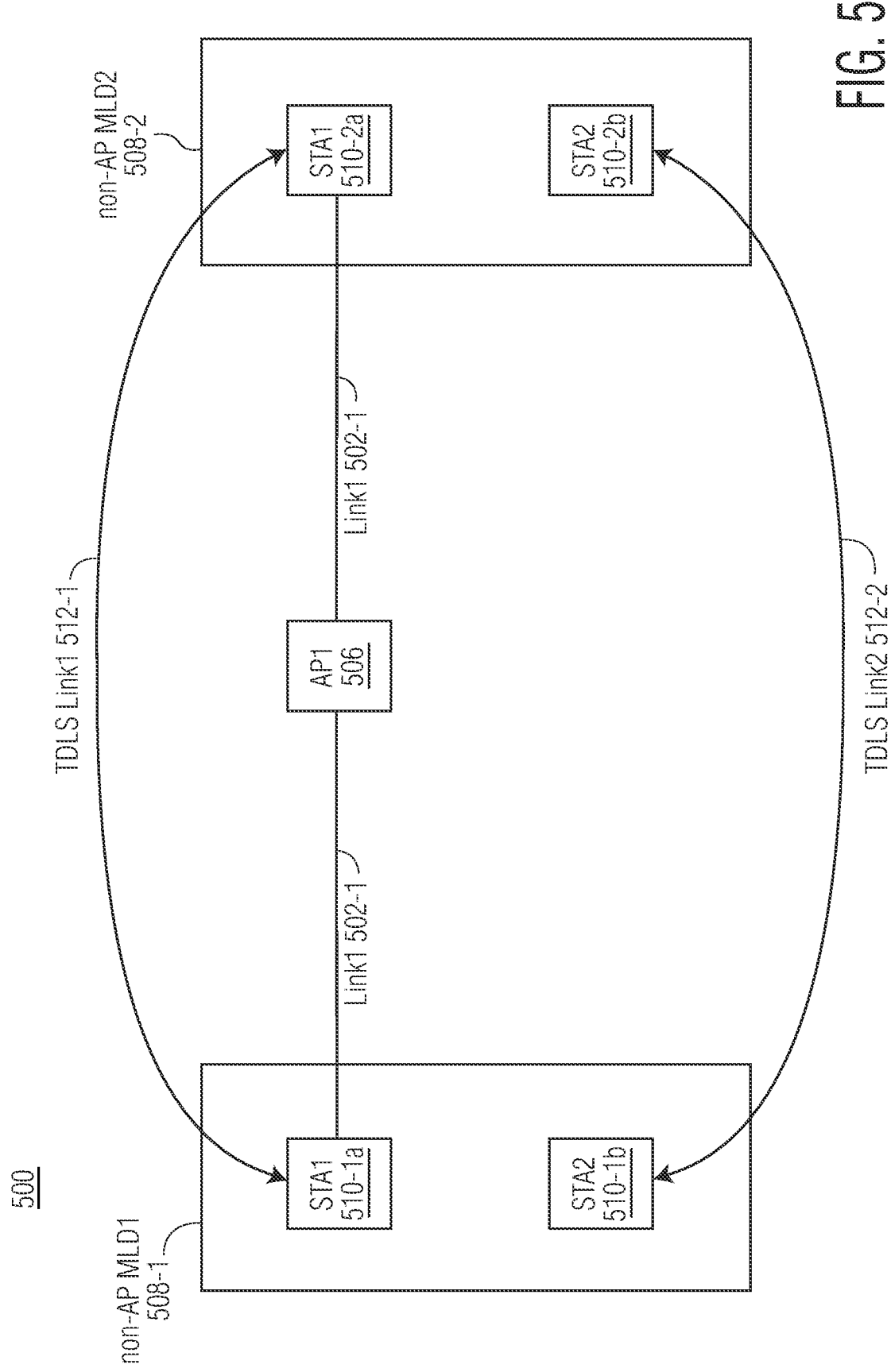
FIG. 5 depicts another example of a communications system with a multi-link TDLS setup.

FIG. 5 depicts another example of a communications system 500 with a multi-link TDLS setup. The communications system 500 shown in FIG. 5 includes AP1 506, non-AP MLD1 508-1 with STA1 510-1*a* and STA2 510-1*b*, non-AP MLD2 508-2 with STA1 510-2*a* and STA2 510-2*b*, Link1 502-1, TDLS Link1 512-1, and TDLS Link2 512-2 as described with reference to FIG. 4.

In contrast to FIG. 4, STA2 510-1*b* and STA2 510-2*b* are not connected to an AP (e.g., AP2 406-1*b*) via a second link (e.g., Link2 402-2). Additionally, AP1 506 may be a non-EHT AP, and may or may not be part of an AP MLD. As such, TDLS Link1 512-1 and TDLS Link2 512-2 are established by frames exchanged between STA1 510-1*a* of non-AP MLD1 508-1 and STA1 510-2*a* of non-AP MLD2 508-2.

In an embodiment, a link address (e.g., link address of Link1 502-1) being used to associate with a non-EHT AP (e.g., AP1 506) is the same as a MAC SAP address of a non-AP MLD (e.g., non-AP MLD1 508-1 or non-AP MLD2 508-2), such that the non-AP MLD is not known to non-EHT AP. In some embodiments, when discovering a peer non-AP MLD through a non-EHT AP, one of the non-AP MLDs (e.g., non-AP MLD1 508-1 or non-AP MLD2 508-2) can allocate a link ID value to links in a TDLS discovery request frame and/or a TDLS discovery response frame. In some embodiments, when discovering a peer non-AP MLD through a non-EHT AP, each non-AP MLD (e.g., non-AP MLD1 508-1 and non-AP MLD2 508-2) can allocate its own link ID value to each of its links in a TDLS discovery request frame and/or a TDLS discovery response frame. In some embodiments, when establishing a multi-link TDLS setup through a non-EHT AP, a TDLS initiating non-AP MLD (e.g., non-AP MLD1 508-1) can allocate the link ID value to the links, such that the links for the multi-link TDLS setup are negotiated. In some embodiments, when establishing multi-link TDLS for a link on which the associated AP MLD does not have an affiliated AP MLD, the TDLS initiating non-AP MLD (e.g., non-AP MLD1 508-1) can allocate the link ID value to the link.

In some embodiments, a TDLS discovery request frame may be transmitted (e.g., by a non-AP MLD) and forwarded (e.g., by an associated AP MLD) in different links. In some embodiments, a TDLS discovery request frame and a TDLS discovery response frame may be used on Link1 502-1 between AP1 506 and STA1 510-2*a* to determine whether non-AP MLD2 508-2 can establish a TDLS link. In some embodiments, a link's (e.g., Link2 502-1) band support is used to determine whether a TDLS link (e.g., TDLS Link1 512-1 and/or TDLS Link2 512-2) can be established. For example, because STA2 510-1*b* and STA2 510-2*b* support a same band, TDLS Link2 512-2 can be established.

In an embodiment, non-AP MLD1 508-1 is a TDLS initiating non-AP MLD and non-AP MLD2 508-2 is a TDLS responding non-AP MLD. In such an embodiment, when establishing the multi-link TDLS setup, the TDLS initiating non-AP MLD determines a link ID value of the plurality of TDLS links. The TDLS responding non-AP MLD may then follow the link ID allocation of the TDLS initiating non-AP MLD.

For multi-link TDLS setup though a non-EHT AP (e.g., AP1 506), in TPK-Key-Data, MAC_I is a MAC SAP address of the TDLS initiating non-AP MLD (e.g., non-AP MLD1 508-1), MAC_R is a MAC SAP address of the TDLS responding non-AP MLD (e.g., non-AP MLD2 508-2), and a BSSID is a MAC SAP address of the non-EHT AP. The TPK-Key-Data also includes link addresses of the plurality of proposed TDLS links of the TDLS initiating non-AP MLD (on which the TDLS initiating non-AP MLD requests to perform direct-link data frame exchanges), and link addresses of the plurality of TDLS links of the TDLS responding non-AP MLD (on which the TDLS responding non-AP MLD agrees to perform direct-link data frame exchanges). In some embodiments, the link addresses of the AP MLD (on which the TDLS initiating non-AP MLD requests to perform direct-link data frame exchanges), the link addresses of the plurality of proposed TDLS links of the TDLS initiating non-AP MLD (on which the TDLS initiating non-AP MLD requests to perform direct-link data frame exchanges), and the link addresses of the plurality of TDLS links of the TDLS responding non-AP MLD (on which the TDLS responding non-AP MLD agrees to perform the direct-link data frame exchanges) are used for MIC calculation.

In some embodiments, if there is no AP in a channel related to a requested TDLS link, i.e., a channel related to TDLS Link2 512-2 (FIG. 5), which is not included in FIG. 5 because there is no related AP, then a dump AP and a related AP BSSID (e.g., AP2 BSSID) is defined for Link2. The dump AP BSSID may be configured for links that do not exist between STAs where a TDLS link is to be established. As an example, the dump AP BSSID may be AP@ BSSID is MSB_44 of AP1 BSSID+(MLB_4 of AP1 BSSID+link ID of Link2) mod 16, where a link ID of Link1 is zero.

In some embodiments, TDLS action frames may include TDLS channel switch request frames, TDLS channel switch response frames, power save-related TDL action frames, and other TDLS action frames. In such an embodiment, the TDLS channel switch request/response frames and the power save-related TDL action frames are link level management frames, and the other TDLS action frames are MLD level management frames.

Figure 6:
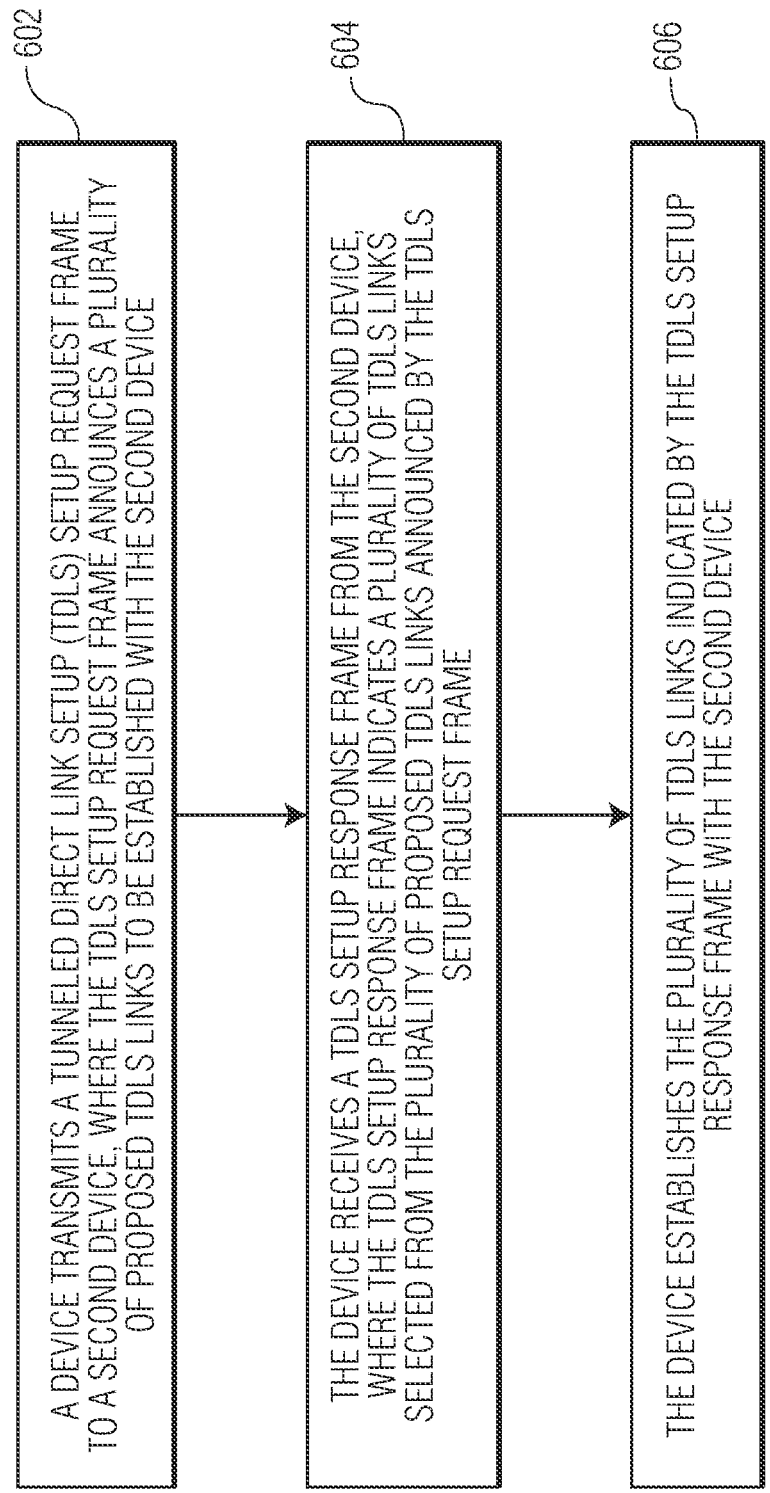
FIG. 6 illustrates a flow diagram of a technique for multi-link TDLS setup in accordance with an embodiment of the invention.

FIG. 6 illustrates a flow diagram of a technique for multi-link TDLS setup in accordance with an embodiment of the invention. At block 602, a device transmits a TDLS setup request frame to a second device, where the TDLS setup request frame announces a plurality of proposed TDLS links to be established with the second device. At block 604, the device receives a TDLS setup response frame from the second device, where the TDLS setup response frame indicates a plurality of TDLS links selected from the plurality of proposed TDLS links announced by the TDLS setup request frame. At block 606, the device establishes the plurality of TDLS links indicated by the TDLS setup response frame with the second device.

In some embodiments, the technique for multi-link TDLS setup may be implemented by a system. For example, a system includes a first wireless device, where the first wireless device includes a wireless network interface device implemented on one or more ICs, where the wireless network interface device is configured to transmit a TDLS setup request frame, where the TDLS setup request frame announces a plurality of proposed TDLS links to be established. In such an example, the system also includes a second wireless device, where the second wireless device includes another wireless network interface device implemented on one or more other ICs, where the other wireless network interface device is configured to receive the TDLS setup request frame from the first wireless device, transmit a TDLS setup response frame to the first wireless device in response to the received TDLS setup request frame, where the TDLS setup response frame indicates a plurality of TDLS links selected from the plurality of proposed TDLS links announced by the TDLS setup request frame, and establish the plurality of TDLS links indicated by the TDLS setup response frame between the first wireless device and the second wireless device.

In some embodiments, the technique for multi-link TDLS setup includes transmitting, by a first wireless device to a second wireless device, a TDLS setup request frame, where the TDLS setup request frame announces a plurality of proposed TDLS links to be established between the first wireless device and the second wireless device, receiving, by the first wireless device from the second wireless device, a TDLS setup response frame, where the TDLS setup response frame indicates a plurality of TDLS links selected from the plurality of proposed TDLS links announced by the TDLS setup request frame, and establishing the plurality of TDLS links indicated by the TDLS setup response frame between the first wireless device and the second wireless device.

Figure 7:
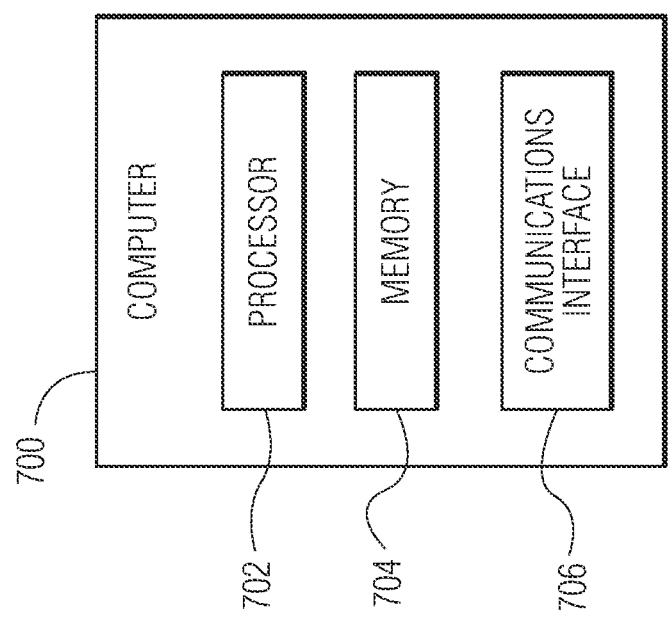
FIG. 7 depicts an example of a computer that can implement the technique for multi-link TDLS setup as described with reference to FIG. 6.

In an embodiment, the above-described functionality is performed at least in part by a computer or computers, which executes computer readable instructions. FIG. 7 depicts an example of a computer 700 that can implement the technique for multi-link TDLS setup as described herein with reference to FIG. 6. As shown, the computer 700 includes a processor 702, a memory 704, and a communications interface 706. The processor may include a multifunction processor and/or an application-specific processor. As an example, the processor could be a CPU (with software), an application-specific integrated circuit (ASIC), a transceiver, a radio, or a combination thereof. The memory within the computer may include, for example, storage medium such as read only memory (ROM), flash memory, random-access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

As an example, the computer 700 may represent a wireless device (e.g., an AP, an AP MLD, a non-AP STA, or a non-AP STA MLD). In such an example, the wireless device includes a wireless network interface device implemented on one or more ICs. As an example, the wireless network interface device may include or connect to antennas, processors, batteries, storage mediums, etc., and may be configured to perform wireless operations and/or communications.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, an RAM, an ROM, a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc. Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
a wireless network interface device implemented on one or more integrated circuits (ICs), wherein the wireless network interface device is configured to:
transmit a Tunneled Direct Link Setup (TDLS) setup request frame to a second device, wherein the TDLS setup request frame announces a plurality of proposed TDLS links to be established with the second device;
receive a TDLS setup response frame from the second device, wherein the TDLS setup response frame indicates a plurality of TDLS links selected from the plurality of proposed TDLS links announced by the TDLS setup request frame; and
establish the plurality of TDLS links indicated by the TDLS setup response frame with the second device;
wherein communication over the TDLS links is based on TDLS Peer Keys (TPKs) defined by link addresses of TDLS links used by the device for the communication and link addresses of TDLS links used by the second device for the communication.

2. The device of claim 1, wherein the device establishes the plurality of TDLS links by transmitting a TDLS setup confirm frame to the second device.

3. The device of claim 1, wherein the device establishes the plurality of TDLS links by transmitting a TDLS setup confirm frame to the second device, and wherein the TDLS setup confirm frame includes an Extremely High Throughput (EHT) Operation element for a reporting link and a multi-link element with another EHT Operation element for each reported link that determine EHT link operating parameters for the plurality of TDLS links.

4. The device of claim 1, wherein the device and the second device associate with a non-EHT access point (AP).

5. The device of claim 1, wherein the device and the second device associate with a non-EHT AP, and wherein a link address used to associate with the non-EHT AP is the same as a Media Access Control (MAC) Service Access Point (SAP) of the device.

6. The device of claim 1, wherein a link's band support is used to determine whether a TDLS link can be established.

7. The device of claim 1, wherein:
the device is a TDLS initiating non-AP multi-link device (MLD);
the second device is a TDLS responding non-AP MLD; and
the TDLS initiating non-AP MLD and the TDLS responding non-AP MLD are associated with an AP MLD.

8. The device of claim 7, wherein in TDLS Peer Key (TPK)-Key-Data:
a MAC address of a TDLS initiating STA (MAC_I) is a MAC SAP address of the TDLS initiating non-AP MLD;
a MAC address of a TDLS responding STA (MAC_R) is a MAC SAP address of the TDLS responding non-AP MLD; and
a Basic Service Set (BSS) Identifier (BSSID) is a MAC SAP address of the AP MLD.

9. The device of claim 8, wherein the TPK-Key-Data includes:
the AP MLD's AP addresses of the plurality of TDLS links;
link addresses of the plurality of proposed TDLS links of the TDLS initiating non-AP MLD; and
link addresses of the plurality of TDLS links of the TDLS responding non-AP MLD.

10. The device of claim 9, wherein the AP MLD's AP addresses of the plurality of TDLS links, the link addresses of the TDLS initiating non-AP MLD, and the link addresses of the TDLS responding non-AP MLD are used for Messenger Integrity Code (MIC) calculation.

11. The device of claim 1, wherein:
the device is a TDLS initiating non-AP MLD;
the second device is a TDLS responding non-AP MLD; and
the TDLS initiating non-AP MLD and the TDLS responding non-AP MLD are associated with a non-EHT AP.

12. The device of claim 11, wherein the TDLS initiating non-AP MLD and the TDLS responding non-AP MLD allocate a link ID value to the plurality of TDLS links.

13. The device of claim 11, wherein the TDLS initiating non-AP MLD determines a link ID value of the plurality of TDLS links.

14. The device of claim 11, wherein in TPK-Key-Data:
MAC_I is a MAC SAP address of the TDLS initiating non-AP MLD;
MAC_R is a MAC SAP address of the TDLS responding non-AP MLD; and
a BSSID is a MAC SAP address of the non-EHT AP.

15. The device of claim 14, wherein the TPK-Key-Data includes:
link addresses of the plurality of proposed TDLS links of the TDLS initiating non-AP MLD; and
link addresses of the plurality of TDLS links of the TDLS responding non-AP MLD.

16. The device of claim 1, wherein the plurality of TDLS links includes all of the plurality of proposed TDLS links.

17. The device of claim 1, wherein the plurality of TDLS links includes part of the plurality of proposed TDLS links.

18. The device of claim 1, wherein the TDLS setup request frame and the TDLS setup response frame are transmitted and received via an AP that is associated with the device and the second device, and wherein the device and the second device exchange frames directly after the plurality of TDLS links are established.

19. A system comprising:
a first wireless device, wherein the first wireless device includes a wireless network interface device implemented on one or more integrated circuits (ICs), wherein the wireless network interface device is configured to:
transmit a Tunneled Direct Link Setup (TDLS) setup request frame, wherein the TDLS setup request frame announces a plurality of proposed TDLS links to be established; and
a second wireless device, wherein the second wireless device includes another wireless network interface device implemented on one or more other ICs, and wherein the other wireless network interface device is configured to:
receive the TDLS setup request frame from the first wireless device;
transmit a TDLS setup response frame to the first wireless device in response to the received TDLS setup request frame, wherein the TDLS setup response frame indicates a plurality of TDLS links selected from the plurality of proposed TDLS links announced by the TDLS setup request frame; and
establish the plurality of TDLS links indicated by the TDLS setup response frame between the first wireless device and the second wireless device;

wherein communication over the TDLS links is based on TDLS Peer Keys (TPKs) defined by link addresses of TDLS links used by the device for the communication and link addresses of TDLS links used by the second device for the communication.

20. A method for multi-link Tunneled Direct Link Setup (TDLS) setup, the method comprising:

transmitting, by a first wireless device to a second wireless device, a TDLS setup request frame, wherein the TDLS setup request frame announces a plurality of proposed TDLS links to be established between the first wireless device and the second wireless device;

receiving, by the first wireless device from the second wireless device, a TDLS setup response frame, wherein the TDLS setup response frame indicates a plurality of TDLS links selected from the plurality of proposed TDLS links announced by the TDLS setup request frame; and establishing the plurality of TDLS links indicated by the TDLS setup response frame between the first wireless device and the second wireless device;

wherein communication over the TDLS links is based on TDLS Peer Keys (TPKs) defined by link addresses of TDLS links used by the device for the communication and link addresses of TDLS links used by the second device for the communication.

* * * * *